United States Patent [19]

Tamulevich et al.

[11] Patent Number: 5,109,468
[45] Date of Patent: Apr. 28, 1992

[54] FIXED VALUE FIBER OPTIC ATTENUATOR

[75] Inventors: Thomas W. Tamulevich, Chelmsford, Mass.; Keith R. Smith, Manchester, N.H.; Stanley V. Paquette, Dracut, Mass.

[73] Assignee: M/A-COM Light Control Systems, Inc., Hudson, N.H.

[21] Appl. No.: 520,775

[22] Filed: May 8, 1990

[51] Int. Cl.$^5$ .................................. G02B 6/38
[52] U.S. Cl. ...................... 385/140; 385/72; 385/73; 385/51
[58] Field of Search ............. 350/96.10, 96.15, 96.16, 350/96.20, 96.21; 385/70, 75, 72, 73, 140, 51

[56] References Cited

U.S. PATENT DOCUMENTS

| | | | |
|---|---|---|---|
| 3,893,753 | 7/1975 | Glenn | 350/271 |
| 4,145,110 | 3/1979 | Szentesi | 350/96.15 |
| 4,186,995 | 2/1980 | Schulmacher | 350/96.20 |
| 4,190,316 | 2/1980 | Malsby et al. | 350/96.18 |
| 4,257,671 | 3/1981 | Barbaudy et al. | 350/96.15 |
| 4,302,069 | 11/1981 | Niemi | 350/96.15 |
| 4,364,639 | 12/1982 | Sinclair et al. | 350/96.15 X |
| 4,557,556 | 12/1985 | Decker, Jr. | 350/96.21 |
| 4,591,231 | 5/1986 | Kaiser et al. | 350/96.18 |
| 4,639,078 | 1/1987 | Sheem | 350/96.21 |
| 4,645,294 | 2/1987 | Oguey | 350/96.15 |
| 4,664,484 | 5/1987 | Hines | 350/394 |
| 4,695,125 | 9/1987 | Sinclair et al. | 350/96.20 |
| 4,697,869 | 10/1987 | So et al. | 350/96.15 |
| 4,702,549 | 10/1987 | Duck et al. | 350/96.15 |
| 4,717,234 | 1/1988 | Barlow et al. | 350/96.21 |
| 4,893,889 | 1/1990 | Iwakiri et al. | 350/96.15 |
| 4,904,044 | 2/1990 | Tamulevich | 350/96.18 |
| 4,986,627 | 1/1991 | Boscher et al. | 350/96.21 |

FOREIGN PATENT DOCUMENTS

| | | | |
|---|---|---|---|
| 54-2143 | 1/1979 | Japan | 350/96.20 X |
| 60-176003 | 9/1985 | Japan | 350/96.20 X |
| 61-28917 | 2/1986 | Japan | 350/96.20 X |

OTHER PUBLICATIONS

Proceedings of the Society of Photo-Optical Instrumentation Engineers Seminar on "Fiber Optics Come of Age", vol. 31, San Mateo, Calif., U.S.A. (16-17), Oct. 1972, Jack B. Weilar, "Plastic Optical Fibers", pp. 3-11.

Primary Examiner—Brian Healy
Attorney, Agent, or Firm—Wolf, Greenfield & Sacks

[57] ABSTRACT

A fiber optic attenuator having a predetermined, fixed attenuation value and low back reflection properties across a broad wavelength spectrum is disclosed. Attenuation is achieved by providing an optical fiber pathway having an attenuation region which causes a predetermined signal loss. The medium defining the pathway is of a substantially constant index of refraction through the device to minimize or eliminate interference caused by Fresnel reflections.

16 Claims, 2 Drawing Sheets

FIXED VALUE FIBER OPTIC ATTENUATOR

FIELD OF THE INVENTION

This invention relates to a fiber optic attenuator having low back reflection properties and a fixed attenuation factor across a broad wavelength spectrum.

BACKGROUND OF THE INVENTION

Optical fiber transmission systems often require that the signal carried through the system be reduced or attenuated before it can be used. Such attenuation generally is carried out using either an attenuator that can be adjusted in situ to provide a desired attenuation level, or in the alternative, by using an attenuator having a fixed, predetermined attenuation factor that is selected prior to use for the specific application. The latter type of attenuator is referred to herein as a "fixed value fiber optic attenuator". The majority of the fixed value attenuators currently used in fiber optic transmission systems rely upon passive filters, air gaps, optical wedges and/or lenses to reduce the signal strength in optical transmission lines.

With increasing data transmission speeds, a phenomenon referred to as "back-reflection" or "return loss" has been identified as causing significant losses in signal strength and quality. The phenomenon is characterized by Fresnel reflections which occur when light is transmitted from a first region having one index of refraction to a second region having a different index of refraction. Current optical fiber attenuators generally operate by employing materials having refraction indices that differ from the refraction index of the optical transmission fiber to thereby cause a reduction in optical signal strength. Thus, back-reflection, and its resultant signal deterioration, is an inherent characteristic of most attenuation systems currently in use.

In addition, most of the attenuators used in fiber optic transmission systems rely upon materials that provide a differing degree of attenuation for differing wavelengths of light. Thus, it becomes necessary to identify the wavelengths to be utilized in the transmission system prior to selecting the specific attenuators. Otherwise, if the wavelengths carried through the system vary, the attenuation will likely vary as well.

SUMMARY AND OBJECTS OF THE INVENTION

It is one object of the present invention to provide an attenuator for use in optical fiber transmission systems in which back-reflection losses are reduced or eliminated.

It is another object of the present invention to provide an attenuator which exhibits a fixed attenuation value across a broad spectrum of signal wavelengths.

It is still another object of the invention to provide an attenuator having an index of refraction that is matched to that of the optical fiber transmission system within which the attenuator is used.

It is another object of the invention to provide an attenuator in which signal attenuation is accomplished by altering the path of the signal across the attenuator.

The present invention relates to fixed value fiber optic attenuators that minimize or eliminate back-reflection. These attenuators employ, as the attenuation means, an optical fiber that defines a light path through the device and contains a discontinuity that reduces the intensity of the light signal passing through the attenuator. The fiber is selected to have an index of refraction that is the same or very close to that of the optical fiber transmission system within which the attenuator is used. Since the refraction indices are matched, Fresnel reflections are reduced or eliminated, and deterioration of signal quality is therefore significantly reduced.

Unlike most conventional attenuators, in which attenuation is the result of passing light across regions having different indices of refraction, the present invention operates by providing a discontinuity in the light path through the attenuator. The discontinuity is contained in a fiber segment having an index of refraction that approximates or equals that of the fibers in the transmission system to thereby minimize back reflection in the attenuation region.

In one embodiment of the invention, the optical fiber that defines the light path through the device includes at least one small bend to cause a constant, identifiable signal reduction. In a second embodiment of the invention, the light path is defined by two optical fibers which are substantially in axial alignment. The fibers have ends which are adjacent one another and slightly offset in the radial direction. The offset is small enough so that at least a portion of the end of one fiber is aligned with a portion of the end of a second fiber. The light signal is attenuated at the portions of the fiber which, as a result of the offset, are not aligned with the adjacent fiber end thereby causing only partial transmission of the signal.

Since, in each embodiment, the attenuation is accomplished by altering the light path rather than by absorbing light of a specific wavelength, the attenuation value is a constant across a broad spectrum. Additionally, by maintaining a substantially constant refraction index across the device and by matching the refraction index of the attenuating fiber and attenuation region to that of the system within which the attenuator is employed, back reflection losses are significantly reduced or eliminated.

DESCRIPTION OF THE PREFERRED EMBODIMENTS

Figure 1:
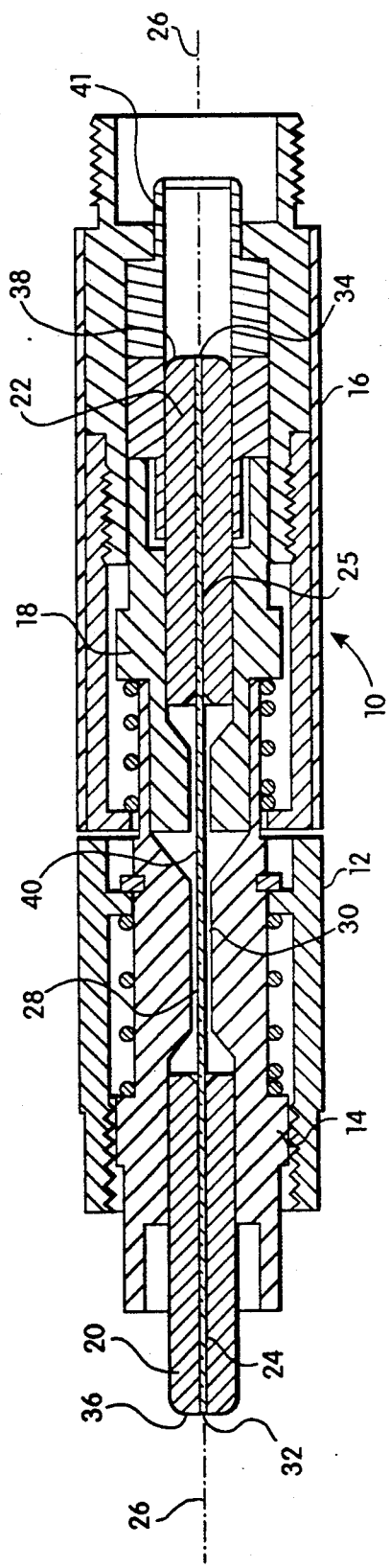
FIG. 1 is an elevational, sectional view of one embodiment of an in-line fixed value fiber optic attenuator of the present invention.

FIG. 1 depicts one embodiment of a fixed value fiber optic attenuator of the present invention. In FIG. 1, the attenuator 10 comprises a first housing 12 containing a female connector body 14 and a second housing 16 containing a male connector body 18. A first ferrule 20 is mounted within the female connector body 14 and a second ferrule 22 is mounted within the male connector body 18. The first and second ferrules each have an axial fiber channel 24, 25 respectively, which runs along the central axis 26 of the attenuator. An optical fiber pathway 28 comprising an optical fiber segment passes through the axial fiber channels 24 and 25 of ferrules 20 and 22 and through a passageway 30 between the ferrules. The ends 32, 34 of the fiber pathway 28 are terminated flush with exterior ends 36, 38 of ferrules 20 and 22 respectively, and are polished to allow transmission of light through the fiber pathway 28.

Fiber pathway 28 includes an attenuation region 40 within passageway 30. The attenuation region 40 is shown in greater detail in FIGS. 2(a) and 2(b). FIG. 2(a) depicts one embodiment of an attenuation region of the attenuator of the present invention in which attenuation is acheived by partial transmission of the signal passing through the attenuation region. In FIG. 2(a), the optical fiber pathway 28 comprises first and second fiber segments 42 and 44. The segments have been joined at fiber junction 46, however, they have been radially offset slightly to provide a light junction 48 and offset faces 50 and 52. The offset distance is small enough to allow a portion of the distal end of the first fiber segment 42 to be in linear alignment with a portion of the proximal end of the second fiber segment 44.

The first and second fiber segments 42 and 44 can either be directly fused together, or in the alternative, they can be maintained in contact or near contact using an adhesive that has an index of refraction that approximates that of the fiber segments. For example, when Corning SMF 21 optical fiber is used as the attenuating fiber, an index matching adhesive such as, for example, a difunctional fluoroepoxy can be used to join the severed fiber ends.

Since the segments are offset, a light signal traveling through first segment 42 can only enter second segment 44 through light junction 48. The portion of the signal exiting segment 42 which is not in alignment with light junction 48 will be lost, thereby producing the desired attenuation. The area of the light junction 48 varies inversely with the amount of offset. Thus, by providing a greater offset between the fibers, the attenuation across the attenuation region will increase. Since the fiber segments are either fused or joined with an index matching adhesive, back reflection losses and interference, resulting from Fresnel reflections will be eliminated.

Figure 2B:
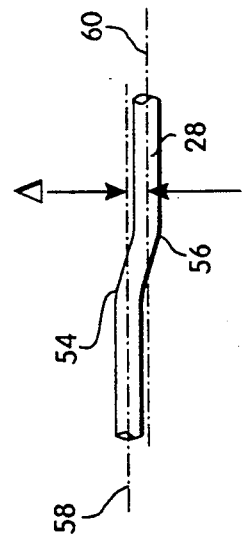
FIGS. 2(a) and 2(b) are schematic representations of two preferred embodiments of optical fiber discontinuities of a fixed value fiber optic attenuator of the present invention.
Figure 2A:
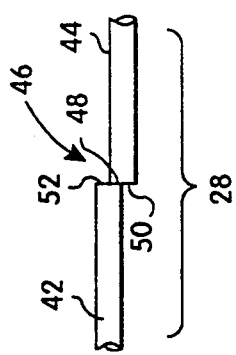

FIG. 2(b) depicts an alternate fiber configuration in the attenuation region. In FIG. 2(b), the fiber pathway 28 is distorted by a pair of bends 54, 56 which cause a slight misalignment or offset of the central axes 58, 60 of the fiber pathway 28 on either side of the bends. By increasing the distance Δ of offset between the axes 58, 60 on opposite sides of the bends, a preselected attenuation value can be achieved. In a preferred embodiment, the axes 58, 60 are maintained in a substantially axial relationship with the offset distance Δ being no greater than the diameter of the optical fiber which defines the optical fiber pathway 28. It is noted that the embodiment of FIG. 2(b) is not intended to be limited to an optical fiber having two bends. Rather, this embodiment requires only that at least one bend be used to cause the attenuation across the optical fiber pathway. As before, the index of refraction across the attenuation region is a constant.

The embodiments of FIGS. 2(a) and 2(b) are both characterized in that they contain discontinuities which cause an attenuation of a signal carried through the fiber, while minimizing back reflection by providing a signal transmission medium having a constant index of refraction. Accordingly, the embodiments of FIGS. 2(a) and 2(b) are intended to be representative examples of a fixed value attenuation means that reduces the strength of a signal carried by an optical fiber without causing the signal to traverse regions having differing indicies of refraction.

The attenuator can have any of a wide variety of terminal configurations on either side of the optical fiber pathway 28 containing the attenuation region 40. For example, the attenuator 10 depicted in FIG. 1 is an in line style device having the exterior end 36 of one ferrule 20 extending beyond the housing 12 for mating with a female connector on a first fiber optic cable or device (not shown). The opposite end of the attenuator 10 comprises a female connector 41 adapted to receive a male fitting mounted on the end of a second fiber optic cable or device (not shown).

Figure 3:
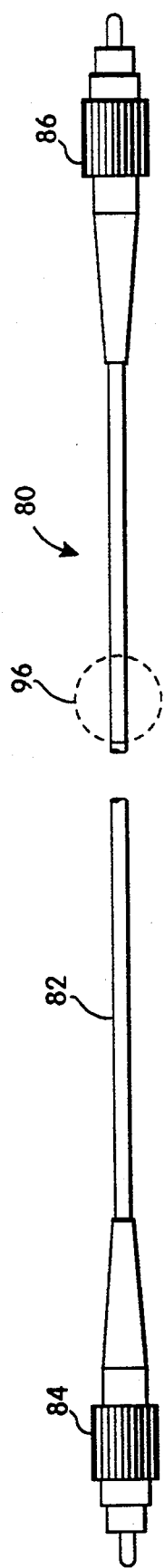
FIG. 3 is an elevational view of one embodiment of a patchcord style fixed value fiber optic attenuator of the present invention.
Figure 4:
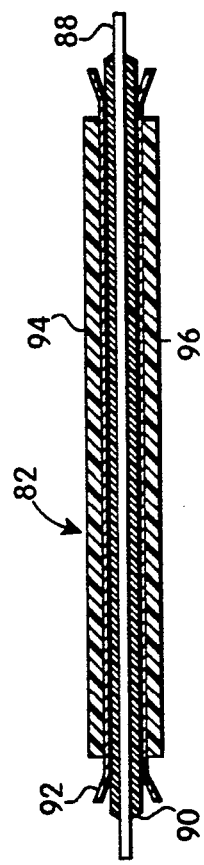
FIG. 4 is an elevational, sectional view of one embodiment of a fiber optic cable contained in the patchcord style attenuator of FIG. 3.

A second embodiment of the device of the present invention is shown in FIG. 3. FIG. 3 depicts a patchcord style attenuator 80 comprising a fiber optic cable 82 having connectors 84, 86 mounted on its ends. The cable 82, is a multi-layered structure of the type shown in FIG. 4. In FIG. 4, an optical fiber pathway 88 is contained within a flexible inner sleeve 90. The inner sleeve 90 serves to protect the fiber pathway 88 and also to provide stiffness to the cable to prevent kinks or other sharp bends in the cable. The inner sleeve 90 can be fabricated of, for example, a thermoplastic material such as nylon. Surrounding inner sleeve 90 is a strengthening material 92. The strengthening material serves to further protect the fiber pathway 88 and also provides additional stiffness to the cable to prevent kinks or other sharp bends. The strengthening material can comprise a wire braid around the inner sleeve, or alternatively can be fabricated of a polymer such as an aramid yarn. An outer jacket 94 surrounds the exterior of the cable to provide a tough exterior to the cable segment. The outer jacket is preferably formed of a material such as polyvinyl chloride (PVC); however any of a variety of tough, flexible materials can be used.

Returning to FIG. 3, the cable 82 contains an attenuation region 96 located at some point between connectors 84 and 86. As in the previous embodiment, the attenuation region is formed by a discontinuity in the optical fiber pathway 88 which causes predetermined signal losses across a region of constant refraction index. The discontinuity is preferably of the type depicted in the text pertaining to either FIG. 2(a) or 2(b), in which either a small offset between pathway fibers or one or more small bends in the fiber pathway, or an equivalent mechanism, causes signal losses.

In FIG. 3, connectors 84, 86 can be of any style used in optical fiber systems, and need not be of the same type. As such, although FIG. 3 depicts a patchcord style attenuator having identical connectors on each end, this embodiment is for purposes of illustration only and is not intended to be limiting.

While there have been shown and described what are at present believed to be the preferred embodiments of the invention, such embodiments are presented by way of example only and are not intended to limit the scope of the invention. Rather, it will be apparent to those skilled in the art that various changes and modifications can be made to the invention described herein without departing from the scope of the invention as defined by the claims presented herein, and their equivalents.

What is claimed is:

1. A fixed value fiber optic attenuator for use in an optical fiber transmission system having a predetermined index of refraction, the attenuator comprising an optical fiber pathway to define a light path therethrough, wherein the optical fiber pathway comprises at least one optical fiber segment having at least one non-attenuation region and at least one fixed value attenuation region to provide a predetermined, fixed attenuation of light passing therethrough, said attenuation region being in substantial axial alignment with said non-attenuation region and wherein the index of refraction along the optical fiber pathway is substantially constant.

2. A fixed value fiber optic attenuator as in claim 1, wherein the the optical fiber segment has at least one bend, the bend defining the attenuation region.

3. A fixed value fiber optic attenuator as in claim 2, wherein portions of the optical fiber segment on opposite sides of the attenuation region are radially offset by a distance of no greater than the diameter of the optical fiber segment.

4. A fixed value fiber optic attenuator as in claim 1, wherein the optical fiber pathway comprises first and second optical fibers aligned in a substantially axial relationship, wherein the distal end of the first fiber is located adjacent to the proximal end of the second fiber, the ends being radially offset by a distance small enough to allow a portion of the distal end of the first fiber to be in linear alignment with a portion of the proximal end of the second fiber.

5. A fixed value fiber optic attenuator as in claim 4, wherein the ends of the first and second fibers are maintained in alignment by an adhesive having an index of refraction approximating that of the fibers.

6. A fixed value fiber optic attenuator as in claim 4, wherein the distal end of the first optical fiber is fused to the proximal end of the second optical fiber.

7. A fixed value fiber optic attenuator as in claim 1, wherein the index of refraction of the optical fiber pathway is substantially equal to the index of refraction of the optical fiber transmission system within which the attenuator is employed.

8. A fixed value fiber optic attenuator for use in an optical fiber transmission system having a predetermined index of refraction, the attenuator comprising:
   a) first and second ferrules each having an axial fiber channel passing through each ferrule, the ferrules being in axial alignment and spaced apart across a passageway;
   b) an optical fiber pathway passing from the axial fiber channel of the first ferrule, across the passageway, and into the axial fiber channel of the second ferrule; and
   c) at least one fixed value attenuation region in the optical fiber pathway to cause a predetermined, fixed attenuation of a light signal passing through the optical fiber pathway,
   wherein the index of refraction along the optical fiber pathway is substantially constant.

9. A fixed value fiber optic attenuator as in claim 8, wherein at least one end of the optical fiber pathway terminates in a flush relationship with one end of the ferrule through which said fiber passes.

10. A fixed value fiber optic attenuator as in claim 8, wherein the optical fiber pathway comprises an optical fiber segment having at least one bend, the bend defining the attenuation region.

11. A fixed value fiber optic attenuator as in claim 10, wherein portions of the optical fiber segment on opposite sides of the attenuation region are maintained in a substantially axial relationship, the portions being radially offset by a distance of no greater than the diameter of the optical fiber segment.

12. A fixed value fiber optic attenuator as in claim 8, wherein the optical fiber pathway comprises first and second optical fibers aligned in a substantially axial relationship, wherein the distal end of the first fiber is located adjacent to the proximal end of the second fiber, the ends being radially offset by a distance small enough to allow a portion of the distal end of the first fiber to be in linear alignment with a portion of the proximal end of the second fiber.

13. A fixed value fiber optic attenuator as in claim 12, wherein the ends of the first and second fibers are maintained in alignment by an adhesive having an index of refraction approximating that of the fibers.

14. A fixed value fiber optic attenuator as in claim 12, wherein the distal end of the first optical fiber is fused to the proximal end of the second optical fiber.

15. A fixed value fiber optic attenuator as in claim 8, wherein the index of refraction of the optical fiber pathway is substantially equal to the index of refraction of the optical fiber transmission system within which the attenuator is employed.

16. A fixed value fiber optic attenuator for use in an optical fiber transmission system having a predetermined index of refraction, the attenuator comprising an optical fiber pathway having a substantially constant index of refraction, to define a light path therethrough, wherein the optical fiber pathway comprises an optical fiber segment having at least one bend, the bend defining a fixed value attenuation region within the light path to provide a predetermined, fixed attenuation of light, and wherein portions of the optical fiber segment on opposite sides of the bend are maintained in a substantially axial relationship and are radially offset by a distance no greater than the diameter of the optical fiber segment.

* * * * *